Sept. 24, 1968  M. I. MINDELL ET AL  3,402,983
MOTION PICTURE FILM READER

Filed Aug. 3, 1965  6 Sheets-Sheet 1

INVENTORS
GEORGE WECHSLER
KARL RUDZITIS
MARVIN I. MINDELL
WILLIAM J. REUSCH, JR.
BY
J. P. Malone

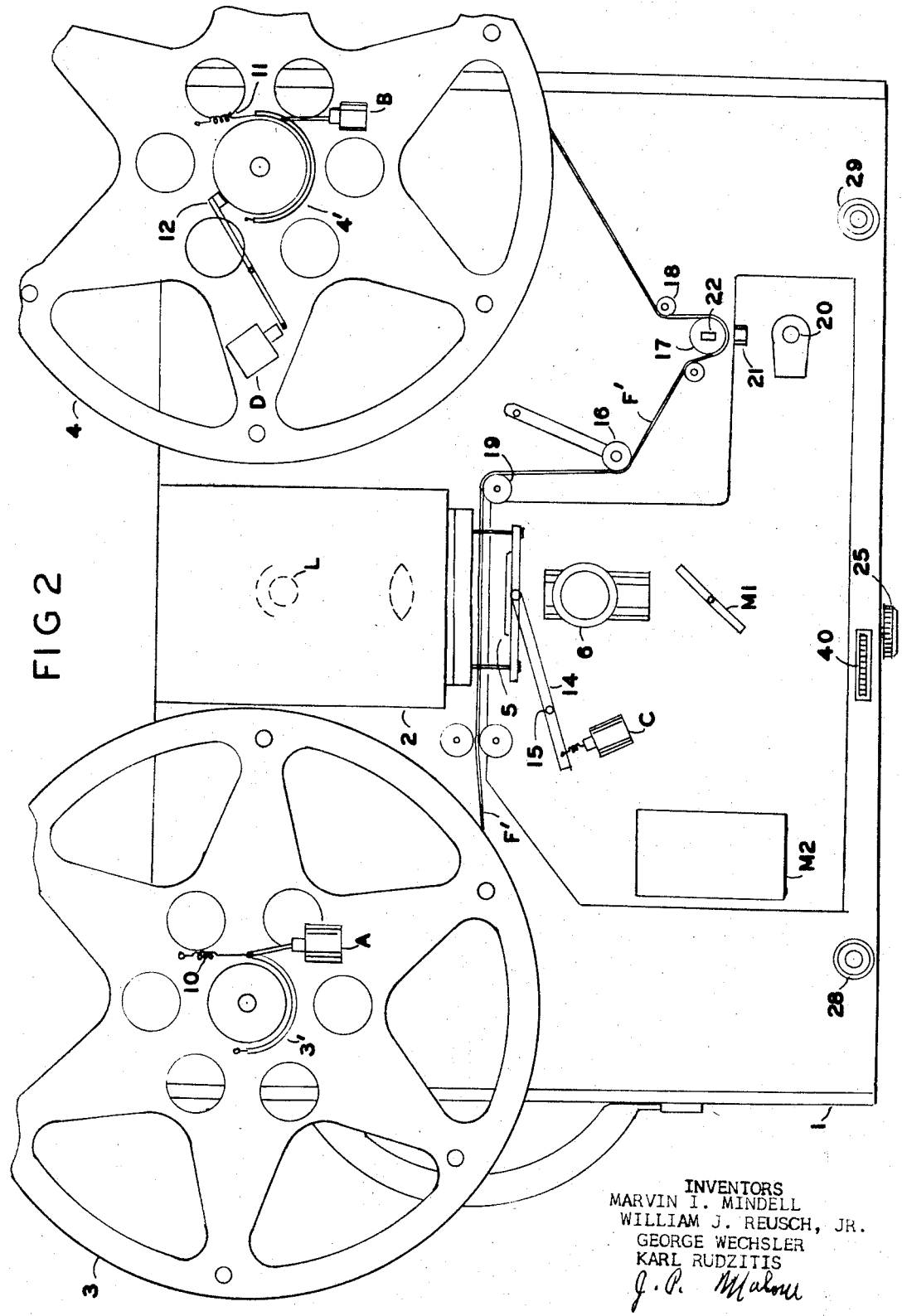

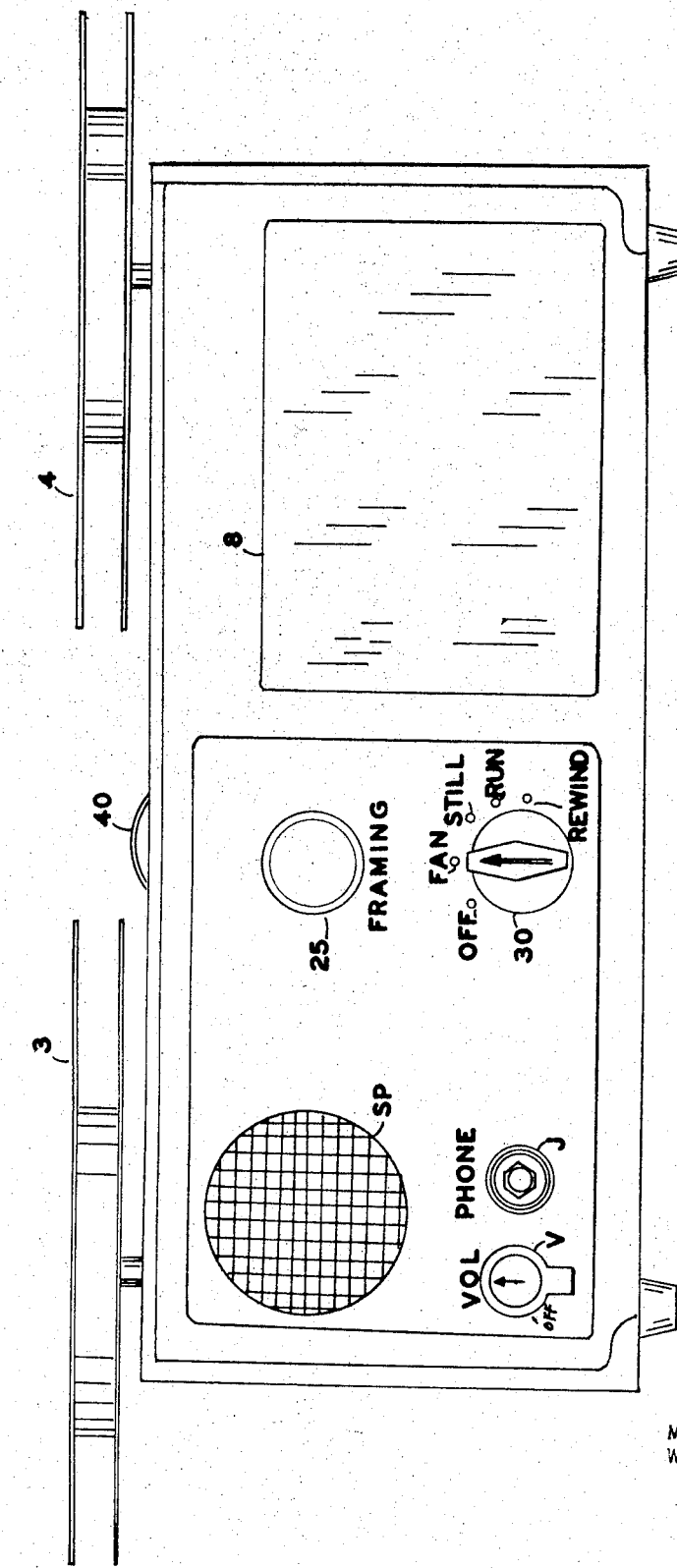

INVENTORS
MARVIN I. MINDELL
WILLIAM J. REUSCH, JR.
GEORGE WECHSLER
KARL RUDZITIS

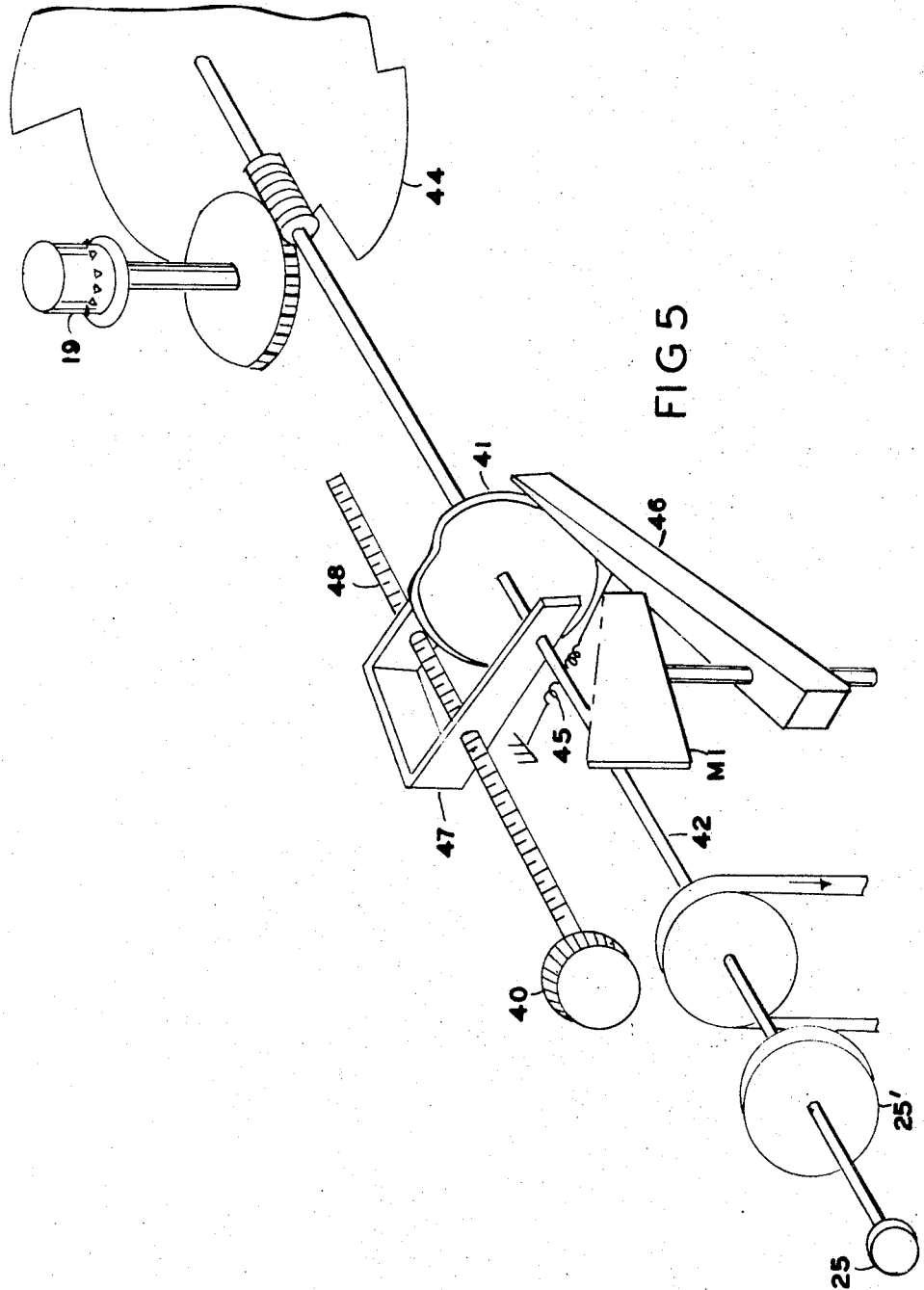

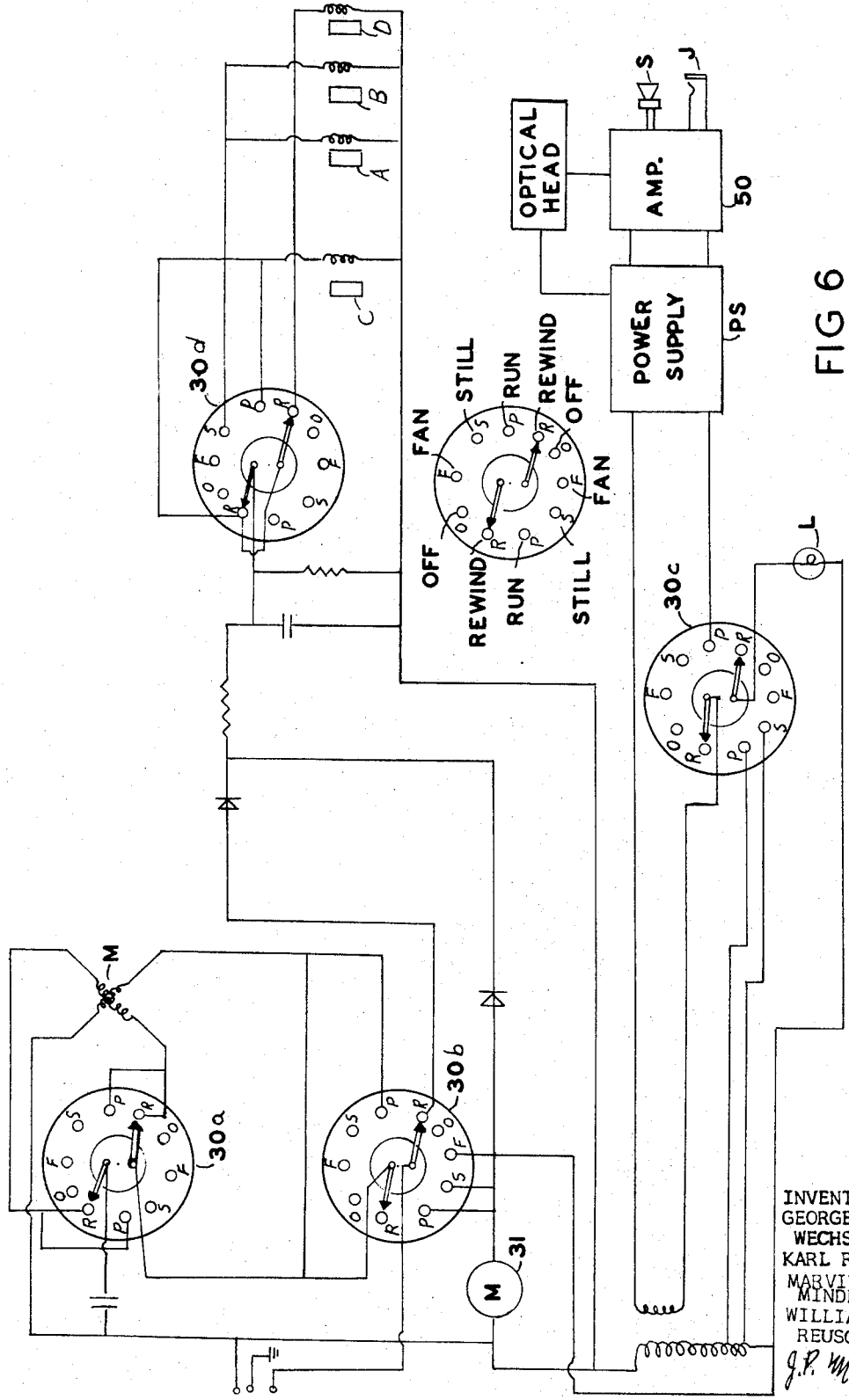

United States Patent Office 3,402,983
Patented Sept. 24, 1968

3,402,983
MOTION PICTURE FILM READER
Marvin I. Mindell, Great Neck, William J. Reusch, Jr., Huntington, George Wechsler, North Bellmore, and Karl Rudzitis, West Babylon, N.Y., assignors to Viewlex, Inc., Holbrook, N.Y.
Filed Aug. 3, 1965, Ser. No. 476,965
3 Claims. (Cl. 352—109)

ABSTRACT OF THE DISCLOSURE

A motion picture film reader in which a mirror is pivotally mounted in front of a projection lamp. The mirror is mounted to oscillate in synchronism with the horizontal movement of the film. Additional mirrors receive the image from the pivotal mirror and transmit the image to a screen. A sound pickup and an amplifier are provided, the sound pickup having an exciter lamp connected in series with the power supply of the amplifier such that it acts as a fuse.

---

This invention relates to motion picture film reader means and more particularly to a table mounted motion picture film reader.

This invention relates to a motion picture film reader which is intended to provide individuals or small groups facilities for viewing either 8 or 16 mm. motion picture film in either silent or sound.

The device features extremely easy loading whereby the film is placed in the device in a manner similar to the way a home tape recorder is loaded. The film reels are mounted horizontally, however, the picture is viewed normally vertically on either a rear projection screen or a standard screen. A unique feature of this device is continuous film motion as opposed to the intermittent motion commonly associated with all motion picture projectors. Since the film is not subject to extreme acceleration at the sprocket area, as it is in motion picture projectors, film life will greatly increase if used exclusively on this machine.

Another unique feature of this machine is a compensating means to provide an adjustment to prevent jitter of the picture due to physical changes in film dimensions caused by film shrinkage or extension which in turn are caused by film aging or humidity or other environmental conditions. This jitter is characteristic of "clawless" type motion picture devices.

Another unique feature of this projector is the use of the exciter lamp as an integral part of the power supply circuitry of the play back amplifier. The explanation of this will appear later on in this discussion.

Another unique feature of this machine is the facility for either projecting to the rear of a screen within the projector which is viewed in the conventional "rear screen" manner or, by removing a mirror, projecting directly on to an external screen for viewing in the conventional manner.

Accordingly, a principal object of the invention is to provide new and improved motion picture film reader means.

Another object of the invention is to provide new and improved table mounted picture film reader means.

Another object of the invention is to provide new and improved film projection means utilizing an oscillating mirror means for stopping the image thereby eliminating intermittent mechanical motion of the film.

Another object of the invention is to provide new and improved film projection means utilizing an oscillating mirror means for stopping the image thereby eliminating intermittent mechanical motion of the film and having cam adjustment means to adjust the oscillating motion of said mirror to eliminate jitter.

Another object of the invention is to provide new and improved motion picture projector means having a sound amplifier and means to regulate the voltage of said amplifier, comprising means to connect the sound pickup exciter lamp in series with the power supply of said amplifier.

Another object of the invention is to provide new and improved motion picture film reader means having means to project the image on a first screen contained in the cabinet or to project onto a remote screen.

Another object of the invention is to provide new and improved motion picture film reader means comprising a table mountable case, a projection lamp means mounted in said case, means to move film at constant speed horizontally in front of said projection lamp means, a pivotally mounted mirror in front of said film to receive a projected image, means to oscillate said mirror in synchronism with said film movement, a screen mounted in front of said case and mirror means placed in said case to transmit said image to said screen.

These and other objects of the invention will be apparent from the following specification and drawings of which:

FIGURE 2 is a top view of the embodiment of FIGURE 1.

FIGURE 3 is a partial front view of the embodiment of FIGURE 1.

FIGURE 5 is a schematic diagram illustrating the oscillating mirror motion control means.

FIGURE 6 is a schematic control circuit.

Referring to the figures, the machine is completely self-contained in a carrying case 1 of approximately 2700 cubic inches. The device consists of two main areas, the top deck and the front panel. The film transport mechanism, lamp and the sound detecting mechanism are all located in the deck area while the rear projection screen and the operating controls as well as a loud speaker are contained in the front panel area. The machine weighs approximately 32 pounds.

Figure 1:
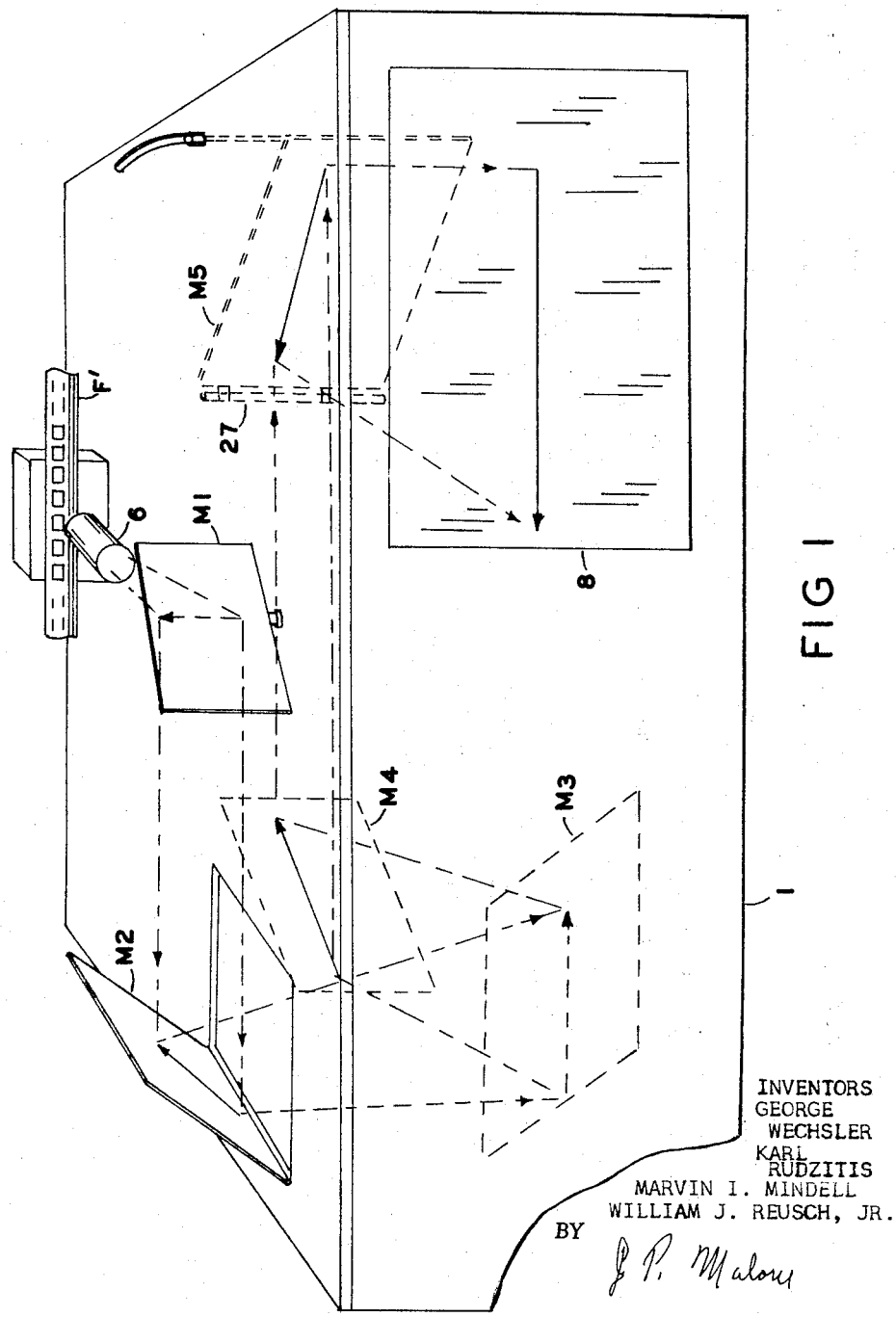
FIGURE 1 is a perspective diagram illustrating the image path in the cabinet.

Referring to FIGURES 1 and 2, the projector lamp L is mounted in the housing 2 and the film is passed from the reel 3 to the take up reel 4 past the film gate 5. The image is focused by the lens 6 and impinges on the pivotally mounted mirror M1. The film is moved horizontally past the optical axis through the film gate at constant speed and the oscillating mirror motion is controlled so as to stop the image thereby eliminating the necessity for any intermittent mechanical motion to move the film F'.

The projector is loaded by placing the reels on the deck supply reel at the left. The machine is threaded by just dropping the film in the slot of the film gate area and then around the idler roller to the sound detector drum around the second roller to the take up reel. No threading is done as in a conventional projector. The film is merely loosely brought around the various components on the deck.

Referring to FIGURE 3, a large knob 30 in the center of the front panel provides the control to operate the device. Five positions appear on this knob. They are FAN, ON, STILL, PROJECT (RUN) and REWIND.

At the top of the projector there are several controls. There is a focus knob 6' which provides focus as in conventional projectors and a steadiness control 40 which provides a steady picture regardless of whether or not the film is in poor condition due to shrinkage. A pair of spindles 28 and 29 are provided for fast rewinding of the film.

The image is then transmitted from oscillating mirror M1 to a fixed mirror M2 and then also referring to FIGURE 1 downwardly to another fixed mirror M3 and then inside the cabinet to another fixed mirror M4 thence to another hinge mounted mirror M5 and thence forwardly onto the viewing screen 8. The mirror M5 is pivotally mounted by means of the hinge 9 so that it may be moved out of the way from the position of the dotted lines in FIGURE 1 so that, if desired, the image may be transmitted onto a remote screen.

Referring again to FIGURE 2, the input reel 3 has a brake band 3' which is spring loaded by the spring 10 which spring pressure is adapted to be released by the solenoid A.

The take up reel 4 is adapted to be braked by the brake band 4' which is spring loaded by means of spring 11 and the spring pressure is adapted to be released by the solenoid B. Also, a tensioning shoe 12 is provided which is operated by the solenoid D. The purpose of the shoe 12 is to place some drag on the rewind cylinder when the cylinder is being rewound so that the film will not run off faster than the rewind reel is moving. When the solenoid D is energized then the shoe 12 places tension on the rewind cylinder.

The film gate 5 is operated by the solenoid C by means of the linkage comprising the pivotally mounted member 14 which is pivotally mounted on the pin 15 and which is pivotally connected to the gate at one end and connected to the solenoid at the other end.

The film passes from the input reel past the film gate and is driven by the drive sprocket 19 past the idler roller 16, the sound head fly wheel 17 and idler roller 18 onto the take up reel 4. The sound pickup is of the optical type having an exciter lamp 20 having a lens 21 and a photo cell pickup 22. The front panel of FIGURE 3 also shows a knob 25 which is a manual advance knob which may be used to frame the film or to view single frames at a time with manual advance. The knob 25 is directly connected to the driven shaft 42 which is shown in FIGURE 5 by clutch 25'.

The front panel also contains the speaker SP and a headset jack J as well as a volume control V to which is connected the on-off switch.

Figure 4:
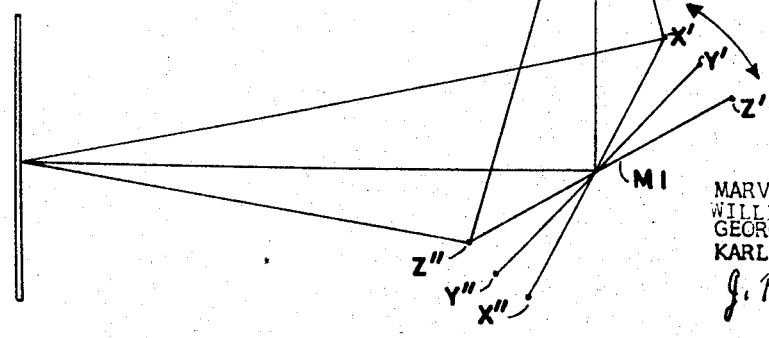
FIGURE 4 is a schematic diagram illustrating the operation of the oscillating mirror.

The operation of the oscillating mirror mechanism can be described by referring to the diagram, FIGURE 4. It will be noted that a point at X on the film F' will be reflected by the mirror to a point on the image plane. If the film moves from left to right so that this same point is now at Y, the mirror must be rotated in order that the point now at Y remains at the same point on the image plane. As this point passes point Z it passes out of the format area and the mirror is rapidly back to point X to pickup the next frame. During this return of the mirror, a shutter 44, FIGURE 5, interrupts the light momentarily to prevent image streaking on the screen.

It can be seen that the mirror must be in exact synchronization with the film in order to maintain a steady image on the image plane. If, due to the shrinkage of film, the point of the film traverses from X to Z' instead of Z, it can be seen that the image of the point at Z prime will be slightly translated from the desired fixed point of the image on the image plane. To compensate for this, the angle of rotation of the mirror must be changed slightly.

Referring to FIGURE 5, this is done by the shrinkage control or steadiness knob 40 by shifting the mirror drive cam 41 in such a manner as to provide a narrower or wider angle of excursion for the cam follower. This is pictured in FIGURE 5. It should be noted from this figure that the entire mechanism relates to a single driven shaft 42 where a mirror drive cam 41 is linked to a film drive sprocket 19 and shutter 44 on a single shaft. In addition, a belt, not shown, drives to take up the rewind spindles. The cam 41 causes the mirror M1 to deflect following the film during the greatest portion of its rotation and during a narrow portion, the cam resets the mirror. A spring 45 keeps the cam follower 46 in contact with the cam 41 at all times. The shrinkage compensator actually moves the cam along the drive shaft changing the point of deflection of the cam follower. The cam is mounted in a U bracket 47 which is moved by worm gear 48 which is connected to control knob 40.

The shutter 44 may have two or three equally spaced blades. Actually, only one blade is used to interrupt the picture for the mirror return. The other two are provided for physiological reasons which have been determined necessary to prevent viewer fatigue. The drive shaft 42 is driven from the motor by a belt.

FIGURE 1 indicates the mirror arrangement used to rotate the image 90° so that a vertical moving image on the screen is obtained from a horizontally moving image on the film. Note that mirror M5 on the projector may be swung aside entirely on hinge 27 and the image projected through a door in the side of case 1 for projection onto a remote screen. Only mirror M1 the oscillating mirror moves during operation.

Referring to FIGURE 6, the control knob 30 operates ganged switches 30a, 30b, 30c and 30d. In the first position FAN, the switch 30b turns the fan motor 31 on which drives two separate fans. The first cools the projection lamp, the second cools the power transformer which is of a high temperature design requiring forced draft ventilation.

In the STILL position, the switch 30c, provides reduced voltage to the projector lamp L, a 21 volt internal reflector type, and switch 30d provides power to the film gate solenoid C. closing the film gate which holds the film in place at the film aperture. The film may now be viewed under still conditions. The reel brake solenoids are energized to allow for manual film advancement.

In the PROJECT (RUN) position the function switch 30d again deactivates the reel brakes by energizing solenoids A and B and switch 30a energizes the drive motor M in the forward direction. The transistor amplifier is also energized in this position by switch 30c and is ready to operate immediately since there is no warm up associated with transistors. When the function switch is rotated to the fan position from this position, the brake solenoids A and B immediately drop out allowing the spring loaded brakes 3' and 4' to stop the reels to prevent loops from forming in the film.

When the function switch 30d is turned left from OFF to the REWIND position, the braking solenoids A and B will again energize and the tension solenoid D is energized on the right hand or take up reel 4 to provide some tension so that the supply reel, as it takes up film in the rewind condition, wraps the film tightly. For rewind, the film is preferably threaded around the outside of the front of the projector case on two spindles 28 and 29.

Figure 7:
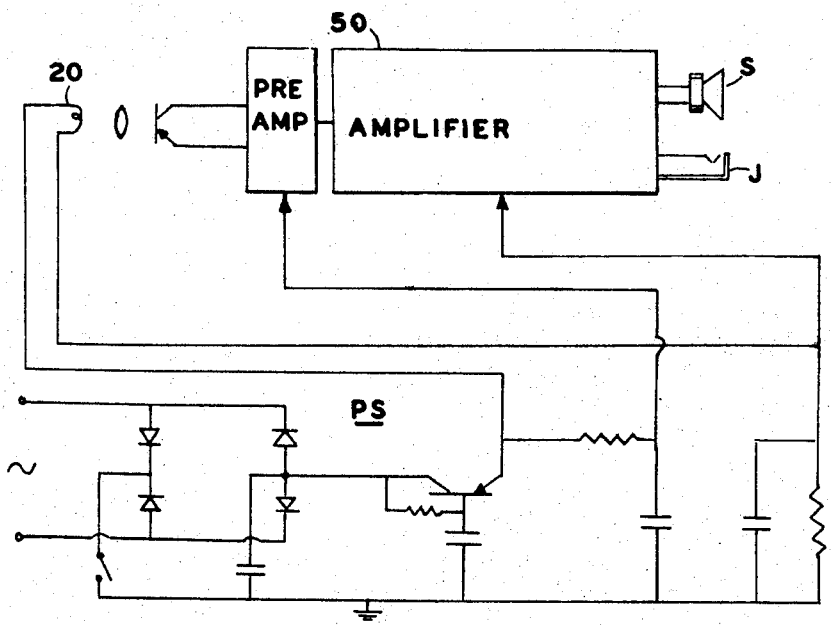
FIGURE 7 is a schematic amplifier circuit.

Referring to FIGURE 7, the play back amplifier 50 is a transistorized amplifier of conventional design except for the power supply PS. The unique part of this power supply circuit is the filament of the exciter lamp 20 is in series with the power supply and amplifier. Since the lamp is necessary to illuminate the sound track of the film anyway, the fact that the lamp filament tends to regulate the current through it is utilized, thus using the lamp in the portion of the circuit provides a voltage regulator, and if the current demand of the amplifier drops slightly the current through the lamp will also drop causing the voltage across the power amplifier to remain the same. Additionally, the lamp tends to prevent thermal runaway in the transistors, provides additional power supply filtering.

Furthermore, the lamp acts as a fuse in the event of a short circuit in the amplifier such as the output transistors. Finally, this arrangement eliminates the need for a separate D.C. exciter lamp supply or special exciter lamp switching.

Thus, at any power level, the voltage across the amplifier is relatively constant enabling the amplifier to be used at its maximum efficiency.

Other features of the film reader are a solenoid operated gate which allows easy insertion and removal of the film from the film gate area during loading. Solenoid brakes are provided to prevent film spillage during rewind and forward operations, and a film tensioning solenoid D which provides for even wrapping of film during rewind. The reels are rotated by spindles which are connected to a single, endless belt, not shown, which also is connected to the shaft that drives the sprocket wheel. Each spindle may be equipped with a one-way clutch which is energized only when the projector's motor rotates in the appropriate direction.

Many modifications may be made by those who desire to practice the invention without departing from the scope thereof which is defined by the following claims.

We claim:

1. A sound pickup having an exciter lamp, an amplifier connected to said sound pickup, and means to regulate, filter, and fuse the input to said amplifier comprising, means to connect said exciter lamp in series with the power supply of said amplifier.

2. Motion picture film reader means comprising, a table mounted case, a projection lamp means mounted in said case, means to move film at constant speed horizontally in front of said projection lamp means, a pivotally mounted mirror in front of said film to receive a projected image, means to oscillate said mirror in synchronism with said film movement, a screen mounted in front of said case, mirror means placed in said case to transmit said image to said screen, a sound pickup having an exciter lamp, an amplifier connected to said sound pickup, and means to regulate the voltage to said amplifier comprising, means to connect said exciter lamp in series with the power supply of said amplifier.

3. Motion picture film reader means comprising, a case, a projection lamp means mounted in said case, means to move film at constant speed horizontally in front of said projection lamp means, a pivotally mounted mirror in front of said film to receive a projected image, means to oscillate said mirror in synchronism with said film movement, a screen mounted in front of said case, mirror means placed in said case to transmit said image to said screen, a sound pickup having an exciter lamp, an amplifier connected to said sound pickup, and means to regulate, filter, and fuse the input to said amplifier comprising, means to connect said exciter lamp in series with the power supply of said amplifier.

References Cited

UNITED STATES PATENTS

| | | | |
|---|---|---|---|
| 1,749,140 | 3/1930 | Killman | 352—109 |
| 1,828,032 | 10/1931 | Decaux | 352—109 |
| 1,856,541 | 5/1932 | Decaux | 352—109 |
| 2,633,774 | 4/1953 | Rounsefell | 88—28 |

FOREIGN PATENTS

| | | |
|---|---|---|
| 44,228 | 9/1934 | France. |
| 817,504 | 5/1937 | France. |

NORTON ANSHER, *Primary Examiner.*

M. H. HAYES, *Assistant Examiner.*